United States Patent [19]
Timmons, Jr.

[11] Patent Number: 5,837,966
[45] Date of Patent: Nov. 17, 1998

[54] APPARATUS FOR WELD HEAD TO PIPE JOINT ALIGNMENT FOR WELDING

[76] Inventor: John E. Timmons, Jr., 85B W. Rosemont Ave., Manchester, N.H. 03103

[21] Appl. No.: 899,350

[22] Filed: Jul. 23, 1997

[51] Int. Cl.$^6$ ........................................... B23K 9/10
[52] U.S. Cl. .................... 219/124.34; 219/60 A; 219/125.11
[58] Field of Search .................... 219/124.34, 60 A, 219/60 R, 61, 125.11, 130.21; 356/376

[56] References Cited

U.S. PATENT DOCUMENTS

| | | | |
|---|---|---|---|
| 3,534,199 | 10/1970 | Downey et al. | 219/60 A |
| 3,636,294 | 1/1972 | Peyrot | 219/60 A |
| 4,175,224 | 11/1979 | Sims et al. | 219/60 A |
| 4,216,365 | 8/1980 | Peyrot . | |
| 4,581,518 | 4/1986 | Takahashi et al. | 219/60 A |
| 4,841,115 | 6/1989 | Severin et al. . | |
| 4,988,201 | 1/1991 | Sugitani et al. | 219/124.34 |
| 5,570,187 | 10/1996 | Nihei et al. . | |

FOREIGN PATENT DOCUMENTS 944451  12/1963  United Kingdom ................. 219/60 A Primary Examiner—Clifford C. Shaw
Attorney, Agent, or Firm—Vernon C. Maine; Scott J. Asmus

[57] ABSTRACT

An improvement to orbital welding heads and welding systems for welding pipe and tubing butt joints, consisting of a removable or retractable detector module in the welding head for sensing the proper alignment of the welding head to the pipe joint prior to welding. The module contains a light source that shires a light beam on the pipe wall, and a detector with associated circuitry and output indicators to signal when the reflected light is interrupted by the presence of a seam or pipe joint. The module may be in the form of a battery powered module that with the use of sleeves fits into the viewing port of a variety of welding heads, or it may be an integral capability that retracts into the side of the weld head out of the way of the welding tip orbiting mechanism. The improvement extends to an automated traversing capability of the welding head along the pipe, in concert with the alignment sensor capability, to provide automated location and clamping of the weld head in the correct position of alignment for welding.

20 Claims, 8 Drawing Sheets

APPARATUS FOR WELD HEAD TO PIPE JOINT ALIGNMENT FOR WELDING

BACKGROUND OF THE INVENTION

1. Technical Field of the Invention

This invention most generally relates to orbital welding heads for welding pipe joints and more particularly to the correct alignment of orbital welding heads over pipe butt joints for welding.

2. Background Art

The welding of pipe and tubing butt joints in critical applications such as hospital/medical systems, nuclear power plants, toxic materials handling, and high temperature and pressure applications in general, requires special equipment and skilled welders. Ultra high purity requirements such as are found in the clean rooms of pharmaceutical and semiconductor manufacturers require that the welding process be as clean as possible so as not to contaminant the surroundings. Welders must often work in "live" process environments such as the manufacturing of pharmaceutical products or semiconductors, where the window or time limit for doing the welding work is conditioned or controlled by the production schedule.

The welding process called Automatic GTAW (Automatic Gas Tungsten Arc Welding) fusion tube welding is the industry standard means for this type of welding. A centrally located computer controlled power source and keyboard pendent are connected by an umbilical cable to a manually manipulated orbital welding head. The welding head has a hinged top which opens for engaging the pipe, and closes around the pipe. The umbilical cable carries electrical DC weld current, 10 to 100 amperes, to the weld head and through a tungsten tip to melt the pipe wall adjacent to the seam, giving full penetration to the weld. The cable also carries electrical power for the rotor motor that revolves the tungsten tip at 0 to 99.9 inches per minute around the circumference of the pipe joint during the weld. Signals relating to welding current, motor speed and time for the four (4) segments of circumference are transmitted to and from the weld head through the umbilical cable. The cable also carries argon or a mixture of other inert gases which is dispensed around the pipe joint within the weld head during the welding process.

The pipe is prepared with machined cut, square bunt joints. The welder first cuts, fits and tack welds the pipes in accordance with the design prints. The tubing is purged with argon or other insert gases to prevent interior oxidation, or "sugar" as it is called. The orbital welding follows. For many jobs, borescoping and recording of the conditions of each weld is a regulatory or contractual requirement to prove quality and meet certification requirements for the finished system.

To accomplish the orbital weld, the welder must first loosely clamp the weld head onto the pipe in the closest proximity to the pipe joint visible to the fielder. The welder must be oriented to be able to see through a window in the top of the weld head and thus visually align the tungsten tip in the weld head precisely on the pipe seam. In most instances the aid of a flashlight is required to positively identify and align the tip and the seam. The weld head is then locked into position on the pipe, and the orbital veld cycle is initiated.

Fatigue, poor lighting, stress, distractions, production requirements, all adversely affect the speed, accuracy of weld head to pipe joint alignment and consequently the cost, quality and reliability of orbital weld joints. The consequences of a bad joint in the middle of a production process with a limited time frame for completion can be very expensive, whether detected at the time of the work, causing delays and costs for rework, or later. In many cases, the consequences of a sudden joint failure after the system is put into operation can be catastrophic.

SUMMARY OF THE INVENTION

It is an object of the invention to provide a removable alignment module for an orbital welding head, that when inserted in and used with the welding head will sense when the welding head is in proper alignment with the pipe joint as the weld head moved slowly across the joint.

Other objects of the invention are to provide for the alignment module to be powered by an internal battery, or by power from the host welding system. In the case of an internal battery, the module may provide externally accessible electrical contacts for charging the battery.

Another object of the invention is to provide mounting sleeves for adapting the alignment module to various welding heads, that can be easily inserted and removed from the welding heads.

Yet another object is for the means for sensing alignment to have a curved surface incorporating a light source that emits a light beam against the wall of the pipe at an angle so that light is reflected off the pipe to a nearby light detector in the curved surface that is likewise angled to detect the reflected light.

Still another object is provide the means for sensing to be configured with a light source and light detector or sensor on a surface that is curved to approximate the curvature of the subject pipe, where the source and sensor are longitudinally coincident but circumfrentially displaced a small amount relative to the overall circumference of the pipe, or where the source and sensor are circumfrentially coincident but longitudinally displaced a small amount relative to the circumference of the pipe, and where the curved surface is supported a similarly small amount from the pipe wall so that the light beam from the source can be directed at an angle towards the pipe wall to be reflected back to the sensor detector.

Still yet other objects are to provide the alignment module with audio and visual signals indicating to the operator when alignment is achieved, to provide for communicating alignment indications to the host operator panel or computer/control pendent, and to provide a calibration adjustment to optimize the detector circuitry for the pipe size and wall and seam conditions.

Additional objects include providing the features of the invention as improvements to an orbital welding head or to an orbital welding system including a host computer/control pendent and power source connected by an umbilical signal and power cord to an orbital welding head.

Further additional objects of the invention include providing the welding head to pipe joint alignment sensing features in an orbital welding head or system with the further automated capability to move the welding head back and forth over a limited range along the length of the pipe while sensing for the butt joint, and to stop and clamp the welding head to the pipe with the proper alignment for welding.

Still other objects and advantages of the present invention will become readily apparent to those skilled in this art from the following detailed description, wherein I have shown and described only a preferred embodiment of the invention, simply by way of illustration of the best mode contemplated by me on carrying out my invention. As will be realized, the invention is capable of other and different embodiments, and its several details are capable of modifications in various obvious respects without departing from the invention.

DESCRIPTION OF THE PREFERRED EMBODIMENT

In its most basic form, the preferred embodiment is a small, portable, battery powered, weld head to pipe joint alignment module. It is used to enable the blind positioning of an orbital weld head unit on a pipe or tubing butt joint to within the required tolerance for precision welding. It is insertable in the opening between the collets at the top of the weld head, and used for sensing when the butt joint is closely aligned with the welding tip. When proper alignment is achieved and the weld head is locked in place on the pipe, the module is removable so that the head can be closed for the welding cycle.

The module contains a sensor, visual and aural indicators, and associated circuitry for sensing the longitudinal passage of the weld head along the pipe over the butt joint, signaling when the head is passing immediately over the butt joint with sufficient sensitivity to allow the operator to position the head correctly over the joint for a weld without having to visually discern the alignment of the butt joint and the tungsten tip of the weld head through the window in the weld head.

Reference is now made to the figures, which illustrate pictorially the various elements of the preferred embodiment of the invention.

Figure 1:
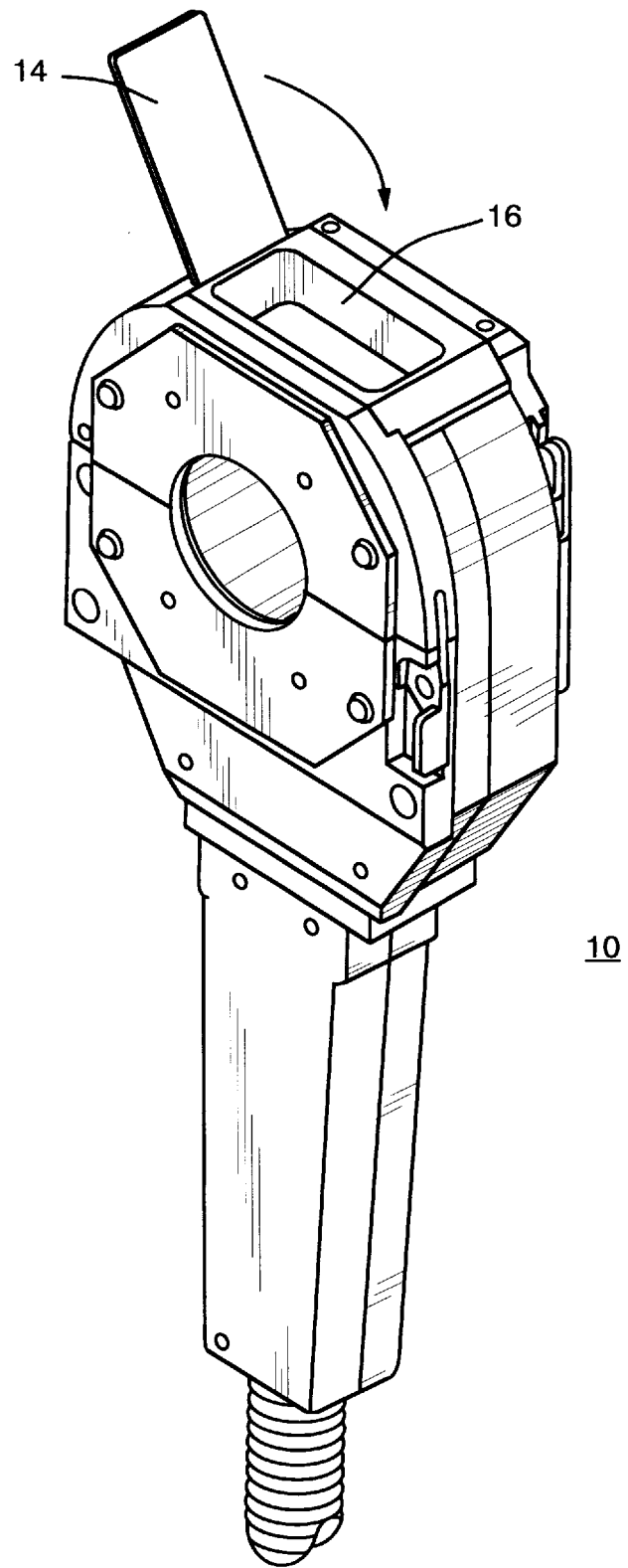
FIG. 1 is a perspective view of a handheld orbital welding head for welding pipe butt joints.

FIG. 1 is a handheld orbital weld head 10 for welding tubing butt joints. The weld head 10 is connected by power, fluid and control umbilical lines to a welding machine, as is common in the prior art.

Figure 2:
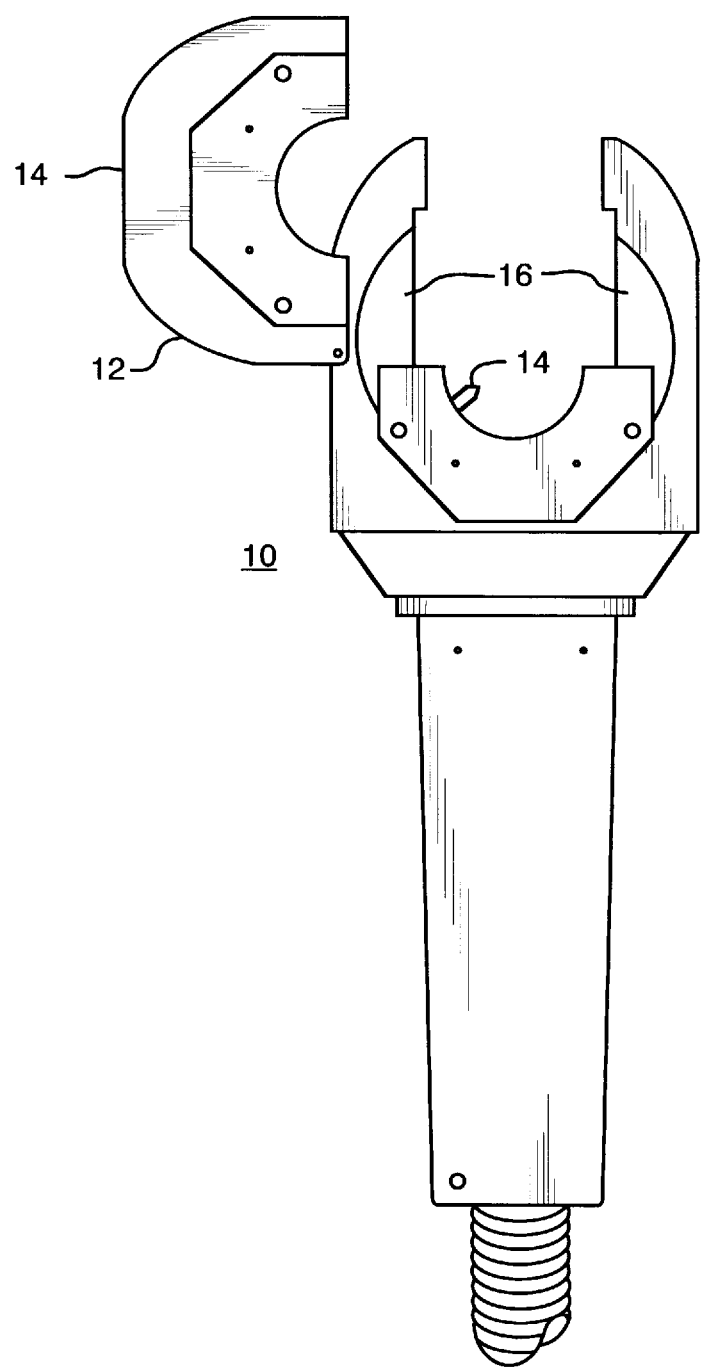
FIG. 2 is a perspective view of the welding head of FIG. 1, showing the top open for engagement with a pipe.

Weld head cap 12 of weld head 10 is hinged on one side as illustrated in FIG. 2 to allow the weld head to be engaged over a pipe, and closable to secure the pipe in a centered but longitudinally slidable manner. Tungsten tip 14 is mounted on rotator mechanism 16 in weld head 10, held in close proximity and normal to the pipe wall. Specific to the invention, cover plate 14 in weld head cap 12 is removable or openable to expose channel 16 for the ready insertion of the sensor end of alignment module 20 of FIG. 3.

Figure 3:
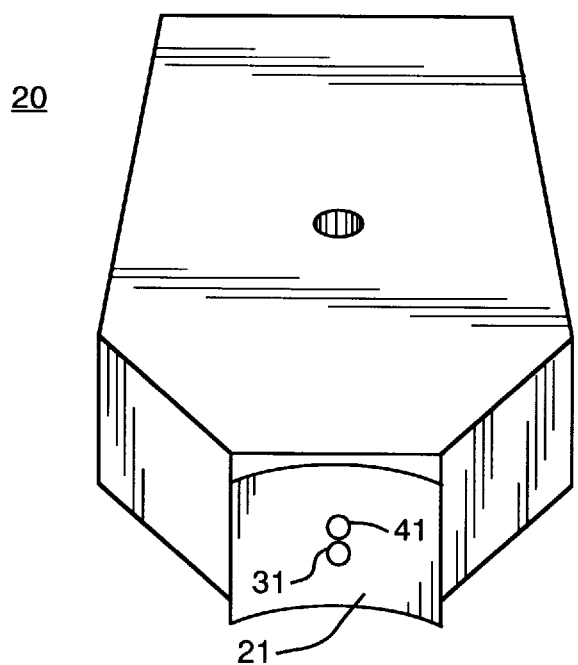
FIG. 3 is a perspective view of the sensor end of a weld head to tubing butt joint alignment module.
Figure 4:
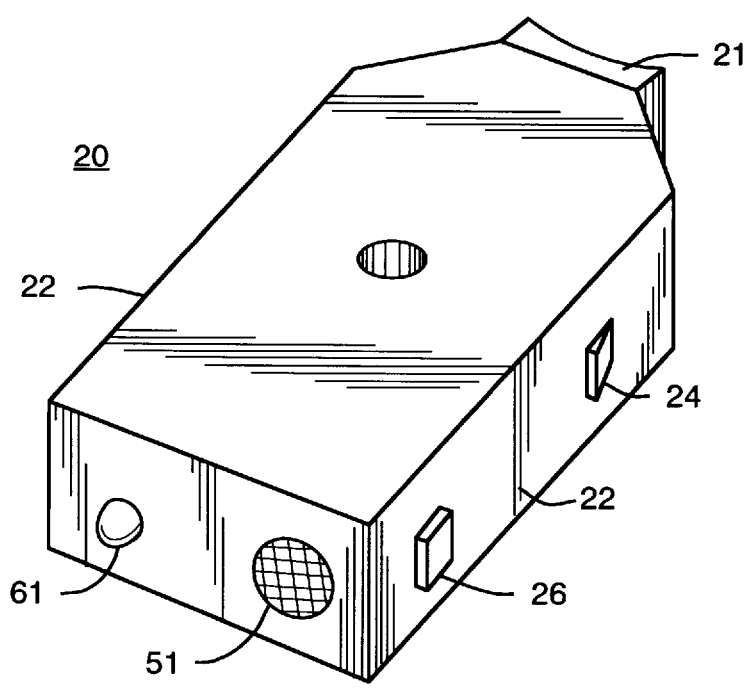
FIG. 4 is a perspective view of the indicator end of the alignment module of FIG. 3.

Alignment module 20 of FIG. 3 and 4 is a small, portable, self powered, weld head to butt joint alignment module, having a sensor consisting of fiberoptic light source 31 and fiberoptic light detector 41 embedded within a curved surface 21 at one end, and a means for signaling consisting of audio tone generator 51 and light emitting diode 61 at the other end. The radius of curvature of curved surface 21 is somewhat smaller than the smallest pipe size radius, in order to insure the presence of a gap between the sensor and the pipe wall at all times.

The sideplates 22 are profiled for ready insertion into channel 16 of weld head cap 12, with the module oriented so that the curvature of curved surface 21 corresponds to that of the pipe wall. Latch mechanism 24 in sideplates 22 self locks module 20 at the correct depth in detents in channel 16. Release buttons 26 in sideplates 22 must be simultaneously depressed to release latch mechanism 24 for removal of module 20 from weld head 10 after the weld head is properly positioned on the butt joint.

Figure 5:
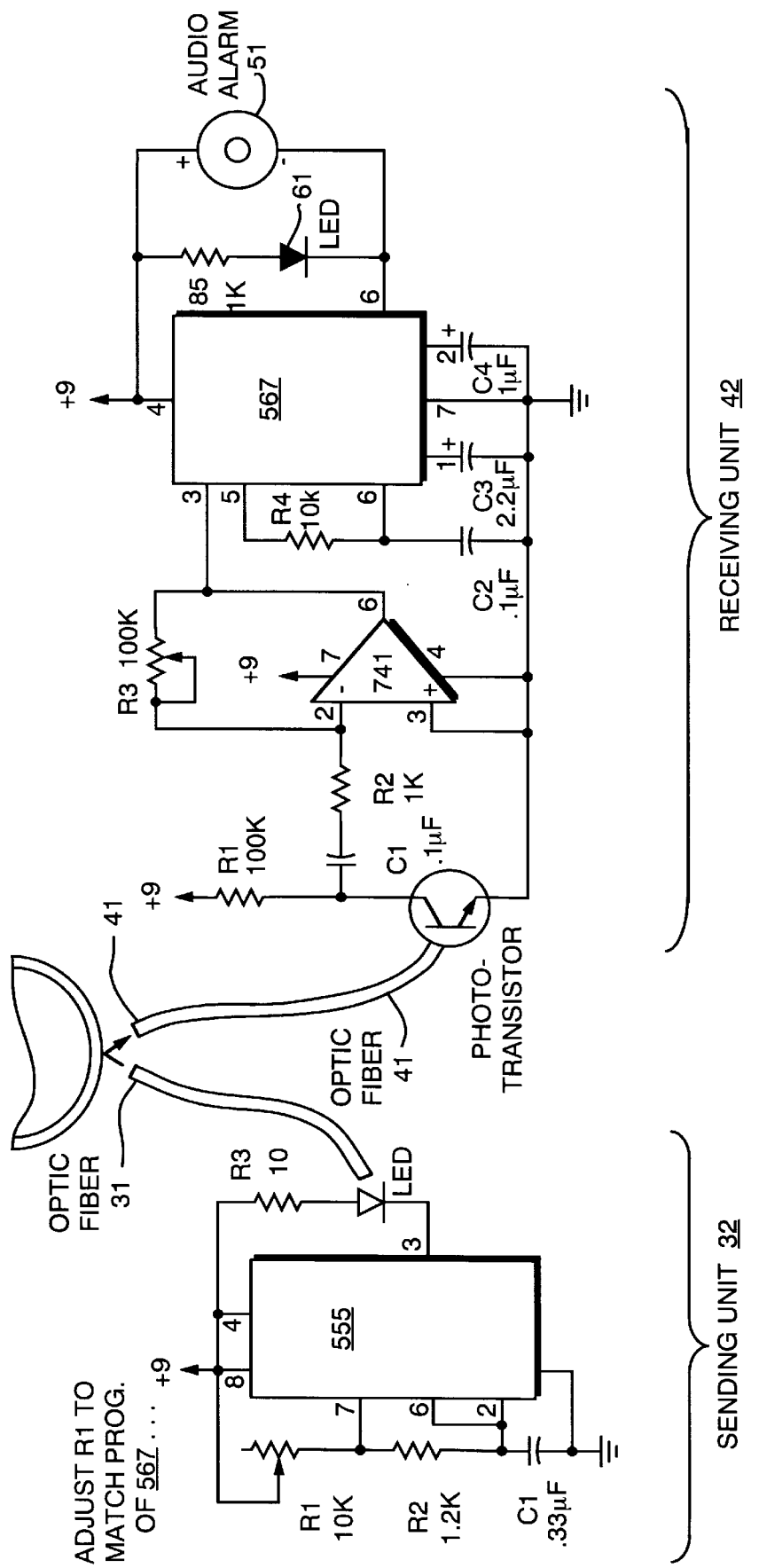
FIG. 5 is a schematic of the circuitry of the sensor of the alignment module of FIG. 3A, incorporating a diagrammatic view of the arrangement of optic fibers utilized in the sensor function.

FIG. 5 discloses the circuitry of alignment module 20. Light source 31 is generated by sending circuit 32; the function of light detector 41 is accomplished by receiving circuit 42. The presence of reflected light at light detector 41 causes light emitting diode 61 and tone generator 51 to be energized. The circuitry uses common principles and readily available components.

Figure 7:
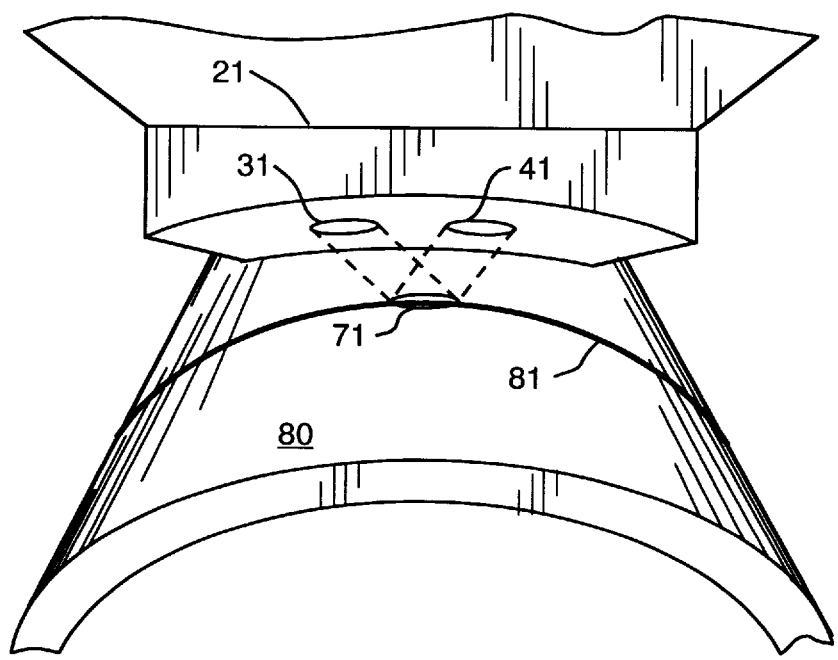
FIG. 7 is a diagrammatic open view into the gap between a sensor module head and a pipe butt joint, illustrating one preferred orientation of light source and sensor elements.

The relative orientation of light source 31 and detector 41 with respect to curved surface 21 (of FIG. 3) and the pipe under work is as illustrated in FIG. 5 and FIG. 7; longitudinally coincident and circumfrentially displaced a short distance and set at about equal angles towards each other to provide the necessary geometry for reflecting light emitted from light source 31 directly off the wall of the pipe to light detector 41.

Referring specifically to FIG. 7, in this embodiment the longitudinally coincident and circumfrentially displaced orientation of light source 31 and sensor 41 on curved surface 21 are angled at about 45 degrees towards each other to enable the wall of pipe 80, absent the presence of a butt joint, to normally reflect the source 31 light beam back to sensor 41. The light beam casts an elliptical or elongated spot 71 on the pipe, the major axis of spot 71 parallel with any butt joint 81, the minor axis of spot 71 defining the width of the target zone through which pipe joint 81 passes. Pipe joint 81, when aligned with the major axis of spot 71, will cause the maximum interruption of the normally reflected light beam.

Figure 8:
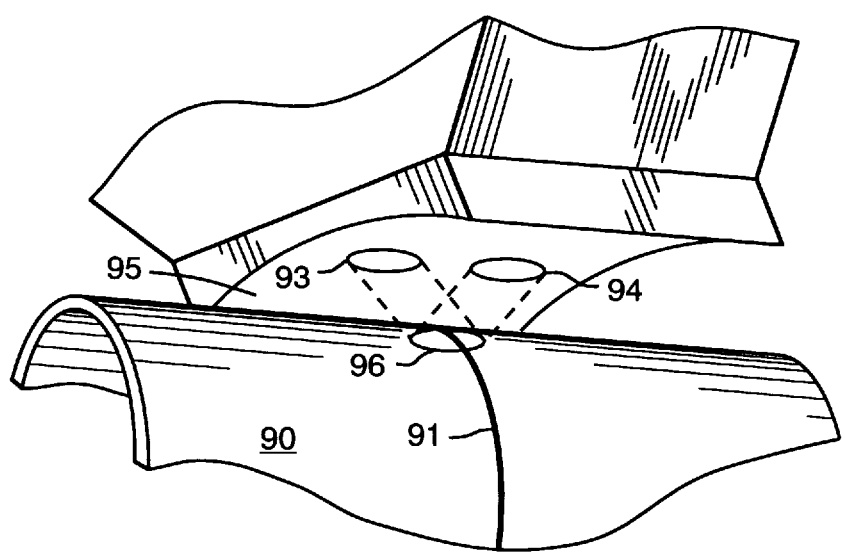
FIG. 8 is a diagranmmatic open view into the gap between a sensor module head and a pipe butt joint, illustrating another preferred orientation of light source and sensor elements.

FIG. 8 illustrates an alternative orientation of light source and sensor. The circumfrentially coincident and longitudinally displaced orientation of light source 93 and sensor 94 on curved surface 95 are angled at about 45 degrees towards each other to enable the wall of pipe 90, absent the presence of a butt joint, to normally reflect the source 93 light beam back to sensor 94 from the longitudinal track of pipe wall circumfrentially normal to the source and sensor, at the point on the track that is midway between the source and sensor. The radius or curvature of the pipe wall away from the track of reflection on both sides, disperses reflected light on either side of the target track, effectively holding the target zone 96 to a very small width. The surface irregularity of pipe joint 91, when positioned at the midpoint between source 93 and sensor 94, causes a detectable interruption of the normally reflected light beam.

Figure 6:
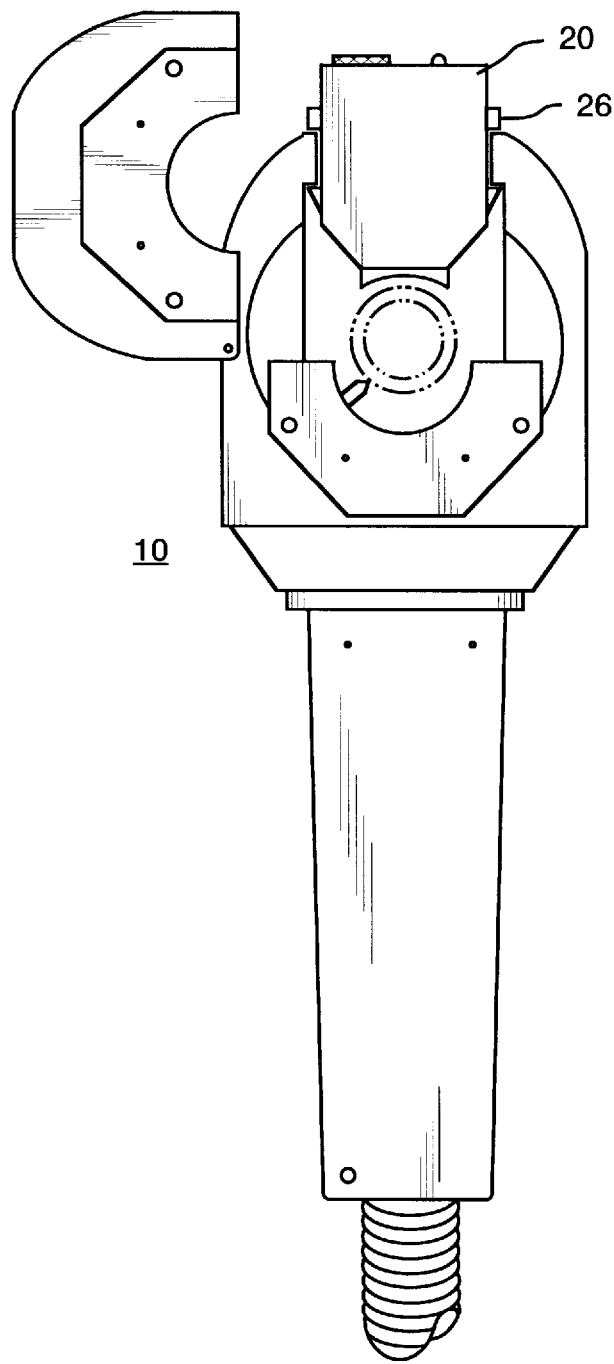
FIG. 6 is a cross section view of the alignment module of FIGS. 3 and 4 inserted into the weld head of FIGS. 1 and 2.

In operation, with weld head 10 engaged on the pipe and module 20 locked in place as described above and illustrated in FIG. 6, the relatively smooth external wall of the pipe will cause the emitted light of light source 31 to be reflected to light detector 41, creating an output signal to the operator that the module is operational and correctly sensing the presence of the pipe wall.

In either source/sensor orientation, when the pipe butt joint passes by the sensor set as the weld head is moved longitudinally along the pipe, the pipe joint momentarily passes through the target area of sensed reflected light causing the irregular surface of the pipe joint to interrupt the normal reflection and it's corresponding signal. The operator is easily able to recognize this "null" condition, and to reposition the weld head at the null position where the pipe joint is at the midway point between source and sensor. The module is then removed by depressing release buttons 26 of FIG. 4; cover plate 14 of FIG. 1 is closed; and the weld initiated.

Adjustment to resistor R3 of circuit 42 by means of an externally accessible screw 25. FIGS. 3 and 4, allows the circuit gain to be calibrated for sensitivity to compensate for the differences in types of pipes and the distance between the sensor and the pipe wall for the particular pipe size being worked on.

To those skilled in the art, the invention admits of many variations. As an example, the principle functions and operating theory of circuits 32 and 42 of FIG. 5 will be readily apparent to those skilled in the art. The circuit details and components are susceptible of many obvious and non-obvious variations capable of duplicating the required functions of sensing the butt joint and signaling alignment, all within the scope of the invention.

As another example, the module may be self powered by means of a battery contained within, or it may be coupled by electrical contacts to the weld head when attached, so that it draws power through the weld head from the welding machine to which the weld head is attached. A battery powered unit may have external contacts for recharging the internal battery by means of engagement with or n a battery charging accessory, in lieu of changing batteries.

As a further example, the module may have a standard profile or case size, and be provided with a mounting sleeve, the outer dimensions of which are designed to be attached or inserted into the top opening of specific existing or new weld heads in such a manner that the sensor is in careful alignment with the plane of the tungsten tip and it's circular path around the axial opening of the weld head. In this manner, a standard design alignment module can be used with a variety of weld heads.

As a yet further example, the sensor end of the module may have a curved surface with a slightly smaller radius than the radius of curvature of the pipe wall so that a gap is assured between the sensor set and the pipe wall for the emitted and reflected light beam, or there may be ribs or other protrusions or physical structure that will provide the same result of holding the light emitter and detector at the necessary distance for the angled light beam to be reflected off the wall of the pipe to strike the detector.

Also, while other arrangements of source and sensor are within the scope of the invention, the orientation of the light source and the light detector can be longitudinally coincident and circumfrentially displaced relative to the pipe being welded, so that the plane of the emitted and reflected light beams is parallel to the seam line or plane of the butt joints. Conversely, the orientation of the light source and the light detector can be longitudinally displaced and circumfrentially coincident relative to the pipe being welded, so that the plane of the emitted and reflected light beams is perpendicular to the line or plane of the seam or butt joint.

As a still yet further example, the module may equipped with a calibration adjustment for matching the sensor function to the type of pipe and condition of the wall or surface of the pipe being welded. The means for calibration may be a simple adjustment to the circuitry of the module to affect gain or sensitivity, or an adjustment to the height or angle of the light source or the detector. It may be an adjustment to the intensity of the light source or the characteristics of the light column, or any other means for sharpening the module's method for distinguishing between the pipe wall of the pipe in work, and a butt joint seam, all within the scope of the invention.

As an additional example, the signal may be emitted at the exterior end of the module as a light or an audio tone or both, or it may be routed into or though the weld head to be emitted at a different point for the operator's benefit, or it may be generated in the form of a digital or electronic signal and be communicated to the weld head and back to the host welding machine for control purposes, recording and/or display.

Also, the signal may be in the form of a null signal, that is, the presence of a light or tone when the pipe wall is detected, and the absence of a signal at the precise position of alignment with the seam or butt joint between two sections of pipe. Conversely, it may be in the form of a positive signal when the seam or butt joint is detected; either being within the scope of the invention.

As another additional example, the sensor may be integrated into the weld head in such a way as to be available or extendible towards the pipe from the side of the weld head for alignment, and retractable to be stowed out of the axial opening to one side in the weld head body, in order to provide clearance for the rotation of the welding tip rotator mechanism during the actual orbital weld operation. The signal indicator may be local, at the weld head, or remoted to the host welding machine via the umbilical cable, or both.

As yet another additional example, the module may work in combination With a welding head configured with a self-sealing module port or point of insertion, whereby the simple removal of the module after alignment causes or allows the port to close and seal the weld head for welding.

As still yet another additional example, the invention may be constituted as a semi-automated welding system for weldhead to pipe joint alignment and welding, consisting of an orbital welding head connected by an umbilical cord to a centrally located, computer controlled power source and keyboard pendent. This system combines the seam sensing features and techniques disclosed above with a weld head having a motorized "walking" or creeping capability controlled by the host computer/power source to move the weld head along the pipe. Once engaged onto the pipe in the vicinity of a seam or butt joint, the weld head is automatically directed to hunt over a limited range or length of pipe for the seam or butt joint, to validate the location by making additional short excursions over the seam, and to then clamp in position on the pipe with proper additional short excursions over the seam, and to then clamp in position on the pipe with proper alignment and retract the sensing mechanism out of the path of the welding tip orbiting mechanism, and then either start the welding cycle automatically as part of an automatic sequence, or at the user's pre-selected option to signal the welder to do so. When the weld cycle is completed, the welder removes the welding head and inspects the weld visually for confirmation.

The creeping or moving capability of the welding head along the pipe is accomplished by two sets of three or more wheels, one on each end of the welding head, which are engaged around and in contact with the pipe under light tension for traction when the welding head is coupled onto the pipe. The wheels are driven in either direction by control inputs from the central host computer/power source as it reads the seam sensor output signals, to carry the weld head along the pipe over the pre-determined range. Resistance to creep commands or failure to identify a seam causes the sequence to be aborted and transmits a signal to the welder.

As still another example, the invention, in manual or semi-automatic modes or embodiments, may be calibrated and used to inspect lengths of pipe and detect surface defects and cracks similar to seams. The head may be configured or equipped with multiple sets of sources and sensors, and/or with a sensor set having an orbital capability similar to the welding tip, for providing greater coverage of the full circumference of the pipe. The source and sensor type and combination may be or include other than light or particular bands of light, including sound and chemical emissions calculated to help distinguish anomalies in the pipe or weld.

In summary, the invention adds a seam or butt joint sensor and alignment indicator capability to a weld head without interfering with the basic operation of the rotary mechanism carrying the welding tip, so the operator no longer has to visually align the welding, tip with the seam or butt joint prior to initiating the weld. The invention further discloses and contemplates features and automated capabilities enabled by this capability.

The objects and advantages of the invention may be further realized and attained by means of the instrumentalities and combinations particularly pointed out in the appended claims. Accordingly, the drawing and description are to be regarded as illustrative in nature, and not as restrictive.

I claim:

1. An alignment module for insertion in an orbital weld head for aligning said weld head with a square cut pipe end butt joint, comprising electronic means for sensing a condition of alignment of said module with said butt joint as said module is moved longitudinally along a pipe, means for generating an output signal indicating said condition of alignment, and means for readily inserting and removing said module from a port in said weld head.

2. The alignment module of claim 1, said module being battery powered and further comprising a battery compartment with battery terminal connectors.

3. The alignment module of claim 1, said module being powered by a separate power source and further comprising terminal connectors for connecting to a said separate power source.

4. The alignment module of claim 1, said means for readily attaching and removing comprising a mounting sleeve configured to accept insertion of said module, said mounting sleeve adapted to be readily insertable and removable through a viewing port on said weld head.

5. The alignment module of claim 1, said electronic means for sensing comprising a curved surface substantially parallel to the wall of said pipe and configured with a light source for emitting a light beam against said wall of said pipe and a light detector for receiving the reflected said light beam off said wall of said pipe, said means for sensing further configured with electronic circuitry for recognizing whether intensity level of said reflected said light beam is above or below a threshhold amount and for switching said output signal in accordance therewith.

6. The alignment module of claim 5, said light source and said light detector configured on said curved surface to be longitudinally coincident and circumfrentially displaced.

7. The alignment module of claim 5, said light source and light detector configured on said curved surface to be circumfrentially coincident and longitudinally displaced.

8. The alignment module of claim 1, said module further comprising an indicator light and an audible sound generator mounted so as to be seen and heard by an operator when said module is attached to said weld head, said output signal being transmitted thereto.

9. The alignment module of claim 1, said electronic means for sensing further comprising means for adjusting sensitivity to discriminate between the surface of said pipe and said butt joint as said module passes thereover.

10. The alignment module of claim 1, further comprising electrical terminals connectable to said weld head for communicating said output signal to said weld head.

11. An improvement to an orbital weld head for aligning said weld head with a square cut pipe end butt joint, comprising an alignment module and a port for insertion and removal of said module, said module comprising electronic means for sensing a condition of alignment with said butt joint as said module is moved longitudinally along a pipe and and means for generating an output signal indicating said condition of alignment.

12. The improvement to an orbital weld head of claim 11, said module being battery powered and further comprising a battery compartment with battery terminal connectors.

13. The improvement to an orbital weld head of claim 11, said module and said weld head further comprising mating electrical terminals for providing power from said weld head to said module, said mating electrical terminals configured so as to connect upon insertion of said module into said port.

14. The improvement to an orbital weld head of claim 11, said module and said weld head further comprising mating electrical terminals configured so as to connect upon insertion of said module into said weld head for transmitting said output signal from said module to said weld head.

15. The improvement to an orbital weld head of claim 11, said electronic means for sensing comprising a curved surface substantially parallel to the wall of said pipe and configured with a light source for emitting a light beam against said wall of said pipe and a light detector for receiving the reflected said light beam off said wall of said pipe, said means for sensing further configured with electronic circuitry for recognizing whether intensity level of said reflected said light beam is above or below a threshhold amount, and for switching said output signal in accordance therewith.

16. The improvement to an orbital weld head of claim 15, said light source and said light detector configured on said curved surface to be longitudinally coincident and circumfrentially displaced.

17. The improvement to an orbital weld head of claim 15, said light source and light detector configured on said curved surface to be circumfrentially coincident and longitudinally displaced.

18. The improvement to an orbital weld head of claim 15, said electronic means for sensing further comprising means for adjusting sensitivity to discriminate between the light levels reflected from the surface of said pipe and from said butt joint as said module passes thereover.

19. The improvement to an orbital weld head of claim 11, said module further comprising an indicator light and an audible sound generator mounted so as to be seen and heard by an operator when said module is attached to said weld head, said output signal being transmitted thereto.

20. An improvement to an orbital welding system for aligning the orbital weld head of said system with a square cut pipe end butt joint, said system comprising an alignment module and a port in said weld head for insertion and removal of said module, said module comprising electronic means for sensing a condition of alignment with said butt joint as said module is moved longitudinally along a pipe and configured to indicate said condition of alignment by means of an indicator light and an audible sound generator mounted so as to be seen and heard by an operator when said module is inserted in said port.

* * * * *